United States Patent [19]

Berte

[11] Patent Number: 4,494,573
[45] Date of Patent: Jan. 22, 1985

[54] ELECTROVALVE

[75] Inventor: François Berte, Le Pecq, France

[73] Assignee: Société Anonyme des Etablissements Jouvenel et Cordier, Rueil-Malmaison, France

[21] Appl. No.: 379,992

[22] Filed: May 19, 1982

[30] Foreign Application Priority Data

Jun. 24, 1981 [FR] France ................................. 81 12373

[51] Int. Cl.³ ...................... F16K 11/04; F16K 31/06; F16K 27/00
[52] U.S. Cl. ............................. 137/625.5; 137/625.65; 251/367
[58] Field of Search ....................... 251/129, 367, 366; 137/625.65, 625.64, 271, 315, 625.66, 625.5

[56] References Cited

U.S. PATENT DOCUMENTS

| 3,635,247 | 1/1972 | Myers | 137/625.5 |
| 3,661,183 | 5/1972 | Komaroff et al. | 137/625.65 |
| 3,936,030 | 2/1976 | Putschky | 251/129 |
| 4,074,700 | 2/1978 | Engle | 251/129 X |

FOREIGN PATENT DOCUMENTS 2903296 7/1980 Fed. Rep. of Germany .
898926 9/1960 United Kingdom .

*Primary Examiner*—Arnold Rosenthal
*Attorney, Agent, or Firm*—Wenderoth, Lind & Ponack

[57] ABSTRACT

An electrovalve includes two interlockable parts, one rigidly connected to a core, and the other carrying a single valve member. Two identical superimposable parts receive the two interlockable parts. The two superimposable parts have seats for the valve member and provide channels for connecting ports of the valve body. The valve body receives the assembly formed by the stacking of the two interlockable parts and of the two superimposable parts.

5 Claims, 4 Drawing Figures

ELECTROVALVE

FIELD OF INVENTION

This invention relates to an electrovalve.

BACKGROUND OF PRIOR ART

The electrovalves presently available on the market are generally made from a number of metallic parts which are difficult to machine. Such electrovalves are relatively costly due, on the one hand, to their manufacturing method which calls for finishing operations, and, on the other hand, to the relatively large number of component parts.

OBJECTS AND SUMMARY OF INVENTION

The object of the present invention is to remedy such disadvantages by providing an electrovalve which is inexpensive and easy to manufacture while making it possible to obtain all the functions which are generally required for the various applications in consideration.

The electrovalve according to the present invention is of the type comprising a single core and a single outer body, and includes:

(a) two interlockable parts, one which is rigidly connected to the core and the other of which carries a single flap or valve member of the electrovalve;

(b) two superimposable identical parts, receiving the two interlockable parts, such two superimposable parts carrying seats for the flap which provide channels for opening and closing valve body ports; and (c) a valve body simple to machine, provided for receiving the assembly formed by the stacking of the two interlockable parts and of the two superimposable parts, and in which are provided the connecting ports of the valve.

According to a feature of this invention, various components of the electrovalve are made from moldable materials (for example plastics, According to the invention, the portions in contact of the two superimposable parts receiving the interlockable parts are formed with conical support surfaces so as to provide a self-clamping and a self-aligning between the two superimposable parts in the body, and to ensure the accuracy of the flap stroke between the two seats.

Further features and advantages of this invention will become apparent from the following description, with reference to the accompanying drawings which illustrate an embodiment of the invention and which are not intended to be limiting.

DETAILED DESCRIPTION OF INVENTION

Figure 2:
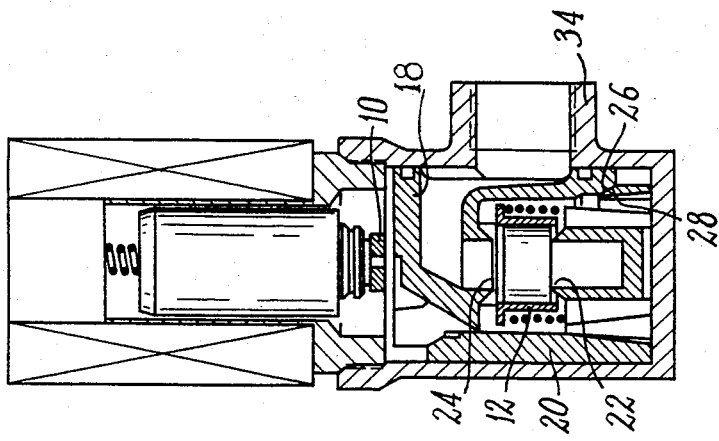
FIG. 2 is a sectional view along line 2—2 of FIG. 4.
Figure 1:
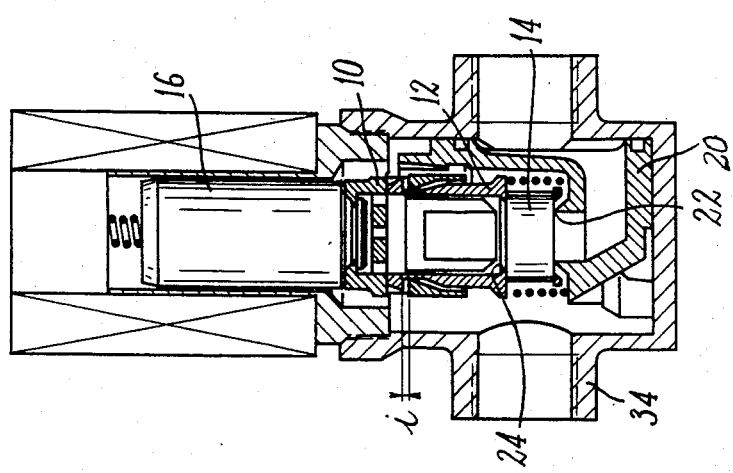
FIG. 1 shows the electrovalve according to the invention, in cross-section along line 1—1 of FIG. 4.
Figure 4:
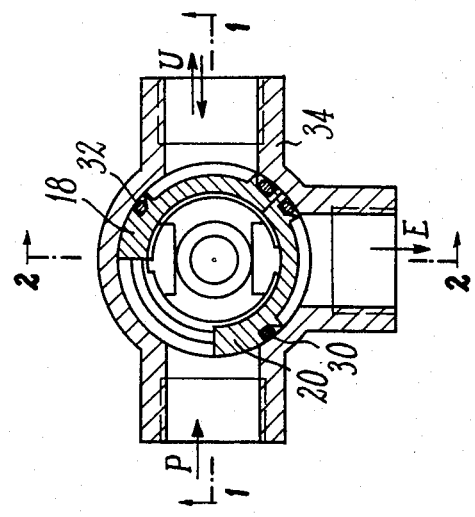
FIG. 4 is a horizontal sectional view along line 4—4 of FIG. 3.
Figure 3:
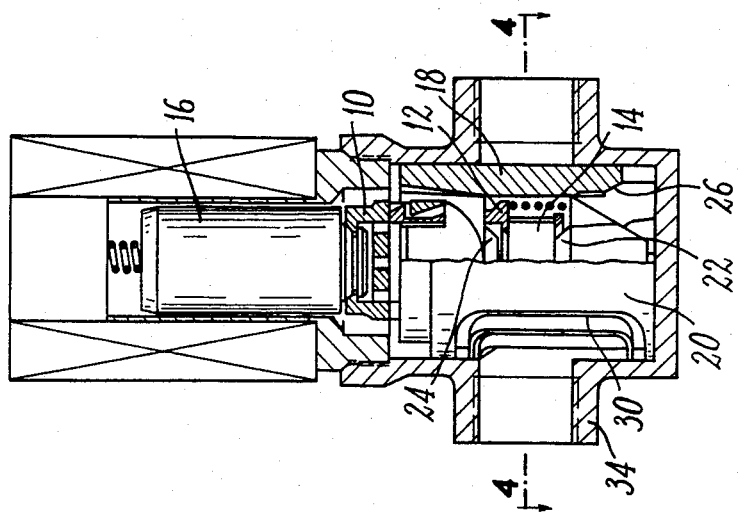
FIG. 3 is a side elevation view of the electrovalve according to FIGS. 1 and 2, partially broken away and in partial vertical section.

Referring to the drawings, the electrovalve of this invention comprises two groups of main components:

(a) two parts 10-12 designed so as to be interlockable one onto the other, as can be seen more clearly in FIG. 1, part 10 carrying a valve control electromagnet core 16, and part 12 supporting a flap or value member 14. Preferably, these two parts are made of a moldable material which is to relatively high temperatures;

(b) two identical superimposable parts 18-20, also made preferably from moldable materials and receiving the two interlockable parts 10 and 12. The part 18 has an upper seat 24 and the part 20 has a lower seat 22 for flap 14 which moves between such seats for alternately closing them. Each of parts 18, 20 is formed with mating lower and upper conical support surfaces, such as 26, 28, making it possible when mounting the parts in the valve body, to provide self-clamping of the elements in contact as well as self-centering there between, and to obtain the required accuracy of the stroke of flap 14 between seats 22, 24;

(c) a body 34 in which are formed, as is known, three connecting ports of the electrovalve.

Assembly of the electovalve is carried out in the following manner:

After having engaged one of parts 10 or 12 inside part 18, the assembly of parts 10 and 12 is provided by interlocking them. Then, the assembly formed by the four parts 10-12 and 18-20 is stacked inside body 34. The tightness between such parts and the valve body 34 is provided by seals 30-32 placed inside grooves formed in the outer surfaces of parts 18-20 and in engagement with the inner boring of body 34. Self-clamping of parts 18-20 is obtained as hereabove indicated, due to the presence of the support surfaces 26-28.

The invention allows providing a large range of diameters of different inner channels by changing a minimum number of parts. Indeed, while keeping always the same interlockable parts 10 and 12, as well as the same valve body 34, what is needed is simply the superimposable parts 18-20 in which are provided the three channels, for changing the diameters of such channels.

The electrovalve according to the invention can perform all the standard functions, two or three channels normally closed, i.e. of providing three universal channels, and two or three channels normally open. Among these possible applications, one can mention in particular taps, cocks and fittings, as well as the control or piloting of distributors. In the latter application, what is needed is only to modify the interlockable parts 18 and 20 such that one of these parts forms the supporting plane and a portion of the body, while the other part forms the other portion of said body. On the front face, the drains are connected through a tapped port, and, on the rear face, the drains can be collected via the exhaust of the distributor.

The advantages provided by the electrovalve according to the invention are notably the following:

a remarkably low cost, notably due to the small number of components, easy manufacture by molding, using plastics materials, and ease of mounting;

a great flexibility is use, due to the possibility of obtaining valves having different diameters for the channel passages, by a simple assembly, by changing only parts 18 and 20 carrying the electrovalve channels;

the absorption of the impact effect between two rigid parts made of identical materials, such impact effect being absorbed due to the presence of clearance "i" (FIG. 1) existing between the two interlockable parts 10 and 12.

The invention disclosed hereabove is obviously not limited to the embodiment described and shown, and encompasses all its modifications.

What I claim is:

1. An electrovalve comprising:
   a core;
   a single valve member;
   first and second interlockable elements interlocked together, said first interlockable element being rigidly connected to said core, and said second interlockable element carrying said valve member;
   two identical superimposable parts superimposed together and receiving therebetween said interlocked elements and said valve member, said two superimposed parts having therein channels, and said two superimposed parts having respective valve seats to be selectively contacted by said valve member, thereby opening or closing selected said channels; and
   a valve body having fitted therein an assembly including said superimposed parts receiving therebetween said interlocked elements and said valve member, said valve body having therein plural ports adapted to be connected to selected said channels.

2. An electrovalve as claimed in claim 1, wherein said elements and said parts are formed of moldable materials resistant to high temperatures.

3. An electrovalve as claimed in claim 1, wherein said superimposed parts having respective plural conical surfaces in mating abutment.

4. An electrovalve as claimed in claim 1, comprising plural interchangeable pairs of said superimposable parts, said channels being of different sizes in said plural pairs.

5. An electrovalve as claimed in claim 1, wherein said first and second elements are interlocked with a clearance therebetween.

* * * * *